United States Patent [19]

Dunbar

[11] 4,048,843
[45] Sept. 20, 1977

[54] SCALE TESTING VEHICLE

[76] Inventor: Glenn G. Dunbar, 2608 Overbrook Drive, Toledo, Ohio 43614

[21] Appl. No.: 704,291

[22] Filed: July 12, 1976

[51] Int. Cl.² .......................................... G01G 23/00
[52] U.S. Cl. .................................................... 73/1 B
[58] Field of Search ................ 73/1 R, 1 B; 177/145, 177/146; 254/86

[56] References Cited

U.S. PATENT DOCUMENTS

| 411,269 | 9/1889 | Taylor | 73/1 B |
|---|---|---|---|
| 2,499,072 | 2/1950 | McClure | 254/86 |
| 2,672,317 | 3/1954 | Barenyi | 254/86 |
| 3,785,297 | 1/1974 | Barnard et al. | 73/1 B |

OTHER PUBLICATIONS

Smith, Testing Equipment for Large-Capacity Scales for the Use of Weights & Measures Officials, Miscellaneous Publication 104, Bureau of Standards, Dept. of Comm., 1930.

*Primary Examiner*—S. Clement Swisher
*Attorney, Agent, or Firm*—Richard D. Emch

[57] ABSTRACT

A scale testing vehicle for use on platform scales, having at least one scale section, is disclosed. The scale testing vehicle includes a chassis which mounts front and rear axle assemblies. A weight bed is mounted on the chassis together with a crane. The weight bed receives a plurality of uniform weight units which may be removed and replaced by the crane from their location on the bed. A pair of lifting cylinders are mounted immediately adjacent and forward the wheels of the rear axle assembly. After the vehicle is driven onto a scale section, the cylinder lifting legs are extended wherein the front of the vehicle is elevated and the entire static load of the vehicle and weight units is applied to the lifting legs and the rear axle assembly, both of which are confined within the periphery of the individual scale section. The known vehicle load is then compared with the load indicated by the scale. If required, individual areas within the periphery of the scale section are tested by removing the vehicle from the scale section and placing uniform weight units at various locations on the scale section. A comparison is then made of the known load of the uniform weight units and the load indicated by the scale at each of the various areas tested.

9 Claims, 5 Drawing Figures

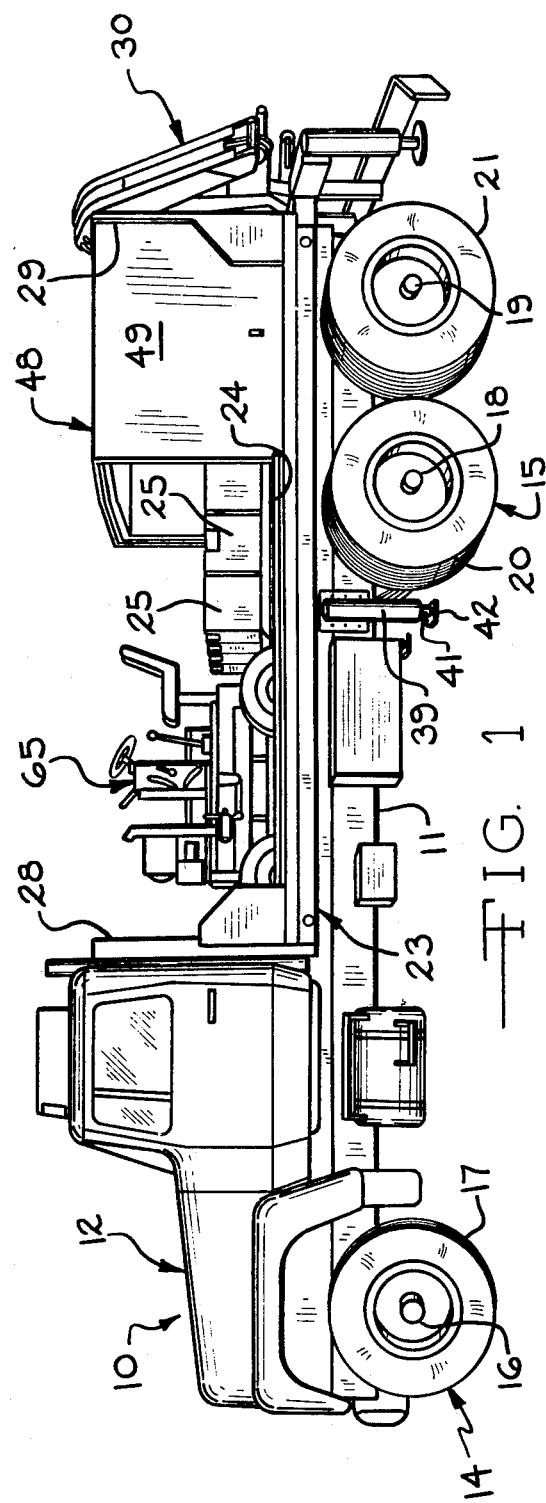
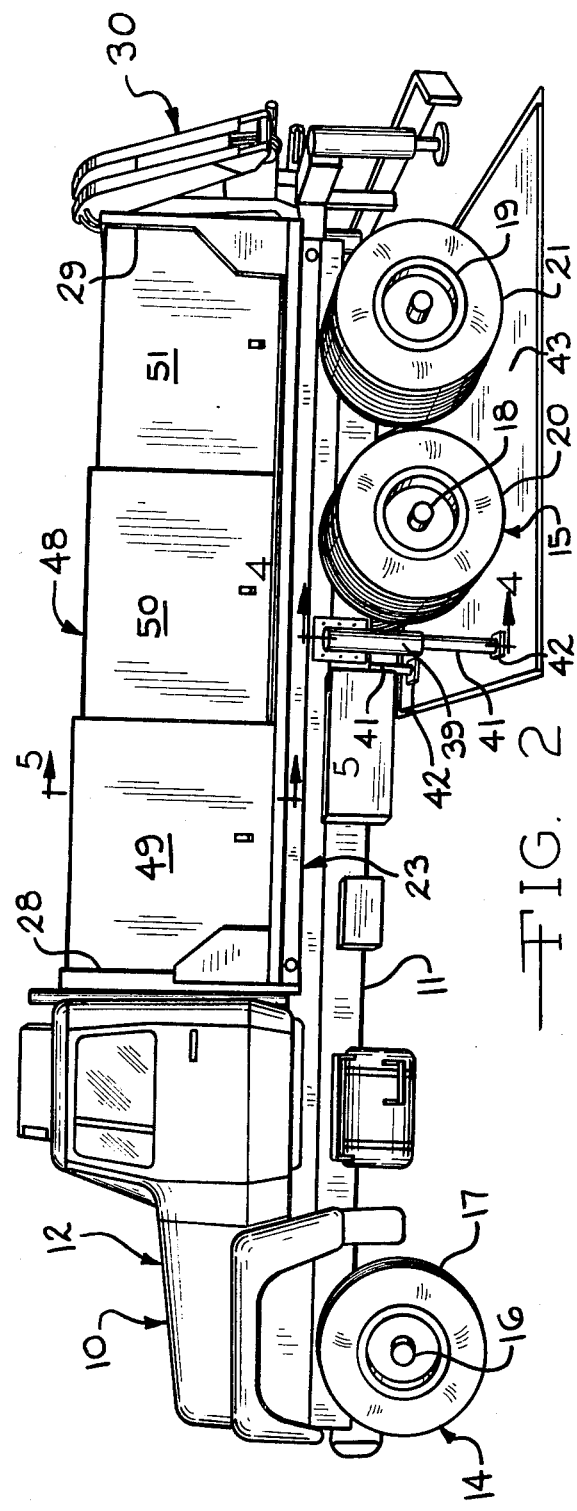

SCALE TESTING VEHICLE

BACKGROUND OF THE INVENTION

Platform scales are well known in the art and are utilized for many different purposes. For examples, platform type scales are used in commercial grain operations for measuring the amount of grain brought to an elevator. Similarly, states utilize platform scales to measure the weight of semi-trailer and tractor units to determine whether or not such units are complying with state laws which regulate highway loads.

The scales may be either mechanical or electronic scales. In either event, the scales often have a plurality of individual scale platforms, for example, a series of three platforms. By mechanical linkage or by electronic load cells, as a vehicle rests on one or more of the platforms, the weight is indicated by the scale.

It is not unusual for such platform scales to measure vehicles and their loads weighing as high as 20 tons and in some cases, as high as 100 tons. Dirt and friction have a tendency to build up at critical points in mechanical scale mechanisms and slow the action of the pivots. Similarly, adjustment drift often has the same effect on electronic scales. In either event, it takes extra weight to reach a given point on the scale indicator or scale readout. Therefore, when this occurs, the scales have a tendency to read a lower weight than the actual weight. Accordingly, the prior art has recognized for a long time that it is important to calibrate platform scales. It is also well known that calibrations will vary even on the same scale at different loadings. Therefore, state agencies often require platform scales to be calibrated at loadings sometimes as high as twice their rated capacities.

In the past, platform scales were tested by placing individual unit weights, normally either 500 pound units or 1,000 pound units, upon the individual platform sections of a platform scale. It was not unusual to have two men spend a considerable amount of time in unloading, testing the scale, and reloading the uniform weights which were carried to the scale site by a vehicle.

It was also known in the prior art to actually drive a vehicle upon an individual segment or section of a platform scale. However, because the individual length of a scale section is approximately 9 feet long, the test vehicle was required to have a relatively short wheel base, somewhere around 100 inches, so that the wheels of the prior art vehicle would rest entirely upon the scale platform being tested. Therefore, such a scale testing vehicle was only suitable with respect to very small scales. If, for example, the vehicle was loaded with uniform weights to the amount necessary to properly load a high rated platform scale section, the test vehicle itself could be in violation of many state highway loading statutes, particularly with respect to bridge loading restrictions.

SUMMARY OF THE INVENTION

The present invention relates to a scale testing vehicle and method. A vehicle according to the present invention, includes a chassis which mounts front and rear axle assemblies and a weight bed. The weight bed includes a weight basket for receiving a plurality of uniform weight units. Cylinder means are mounted adjacent and immediately forward of the rear axle assembly. After the vehicle is moved onto an individual section of a scale, the cylinder lifting legs are extended, elevating the front wheels of the vehicle. The entire static load of both the vehicle and the plurality of unit weights is located within the periphery or confines of the individual scale section. In the embodiment shown in the drawings, a 48,000 pound gross weight is positioned upon a scale platform. The known gross load or weight is then compared with the scale indicated weight. If the known weight and the indicated weight are within allowable limits, the testing procedure takes only a few minutes with respect to each section of the scale. On the other hand, if the indicated weight and the known weight show a discrepancy, then a crane mounted on the scale testing vehicle is utilized in removing individual uniform weight units. These calibrated individual units are utilized in the testing of individual areas within the periphery of the scale section. If necessary, adjustments and repairs are made in the scale mechanism or load cell apparatus. It has been found that a scale testing vehicle, according to the present invention, may be utilized by one man and greatly reduces the amount of time required to test the individual scales.

DESCRIPTION OF THE DRAWINGS

FIG. 1 is a side elevational view of a scale testing vehicle, according to the present invention, showing a telescopic canopy moved to the rear of the vehicle;

FIG. 2 is an elevational view, similar to FIG. 1, showing the vehicle in a testing position on a section of a platform scale;

DESCRIPTION OF THE PREFERRED EMBODIMENT

Figure 3:
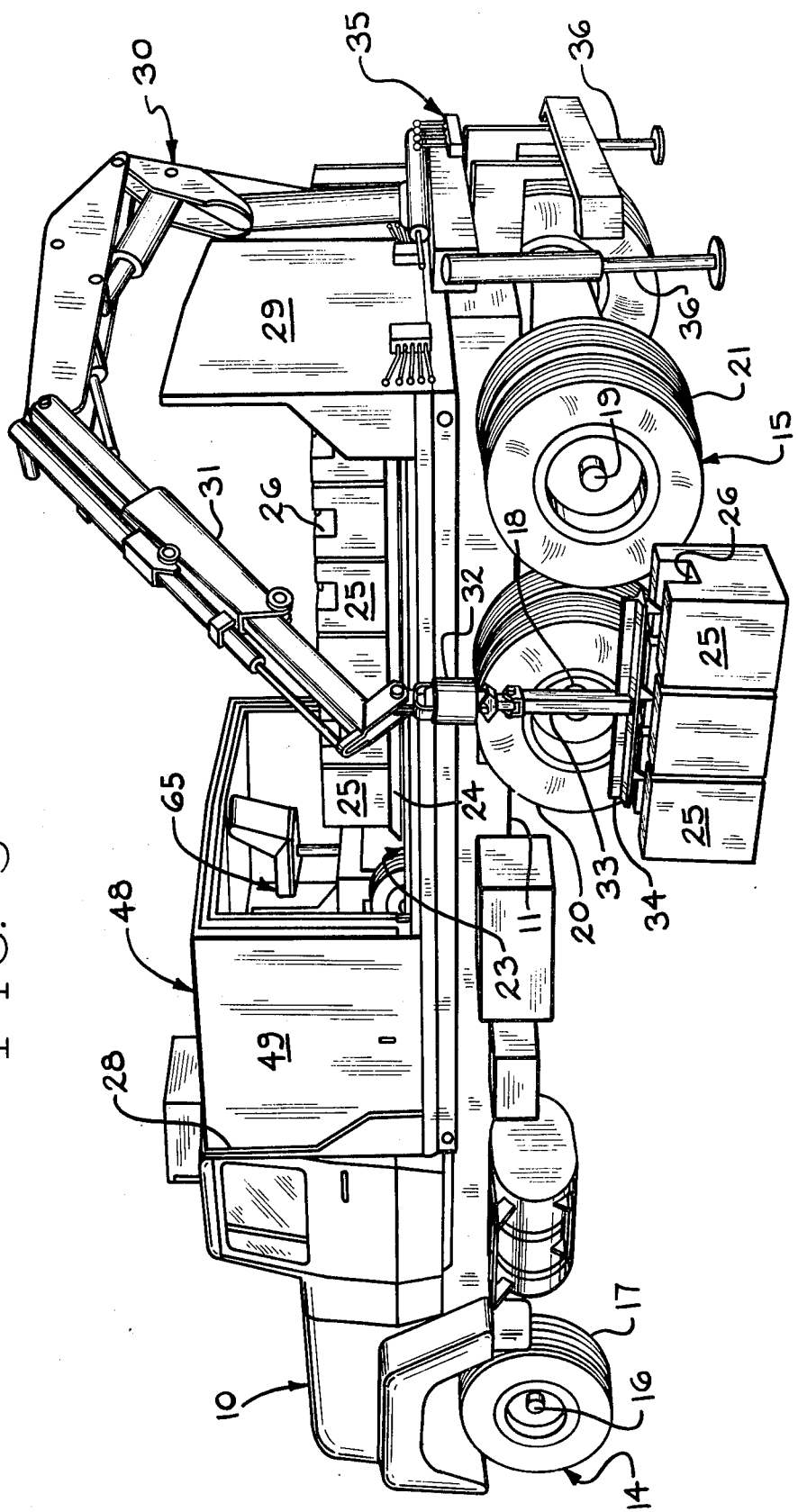
FIG. 3 is a perspective view showing the vehicle with the crane being utilized to unload a plurality of uniform weight units.

A scale testing vehicle, according to the present invention, is indicated in FIGS. 1-3 by the reference number 10. The vehicle 10 includes a chassis 1 having a drive unit 12 consisting of, for example, a 534 h.p. V-8 gasoline engine together with a 5 speed transmission.

A front axle assembly 14 and a rear axle assembly 15 is mounted beneath the chassis 11. In the present embodiment, the front axle assembly 14 comprises a single axle 16 having wheels 17 mounted at its outer ends. The rear axle assembly 15 includes a pair of axles 18 and 19 having sets of tandem wheels 20 and 21 mounted on the outer ends.

The chassis 11 supports a weight bed, generally indicated by the reference number 23. A generally rectangular weight basket 24 is positioned on the bed 23 and receives a plurality of uniform weight units 25. In the present embodiment, 24 1,000 pound weight units 25 are received by the basket 24. The uniform weight units 25 are known in the art, and include a recess (not shown) which holds shot. By adding and removing shot the weight units 25 are carefully calibrated so that each unit 25 has a uniform weight of 1,000 pounds. Referring to FIG. 3, each of the uniform weight units 25 includes carrying slot 26.

A front bulkhead 28 is located at the front of the weight bed 23 and a rear bulkhead 29 is located at the rear end of the bed 23. Referring specifically to FIG. 3, a crane 30 is mounted on the chassis adjacent the rear end of the bed 23. In the present embodiment, the crane 30 comprises an articulated boom hydraulic crane which includes an extensible boom section 31. A rotator assembly 32 is positioned on the outboard end of the extensible boom section 31 and mounts an implement 33 which includes a three hook spreader bar 34. The three hook spreader bar 34 engages fittings in the carrying slots 26 of the uniform weight units 25. In this manner, the crane 30 (See FIG. 3) is utilized in loading and unloading the uniform weight units 25 between ground elevation and the basket 24 on the bed 23. The crane 30 also includes a control unit 35 and a pair of stabilizing outriggers 36.

Figure 4:
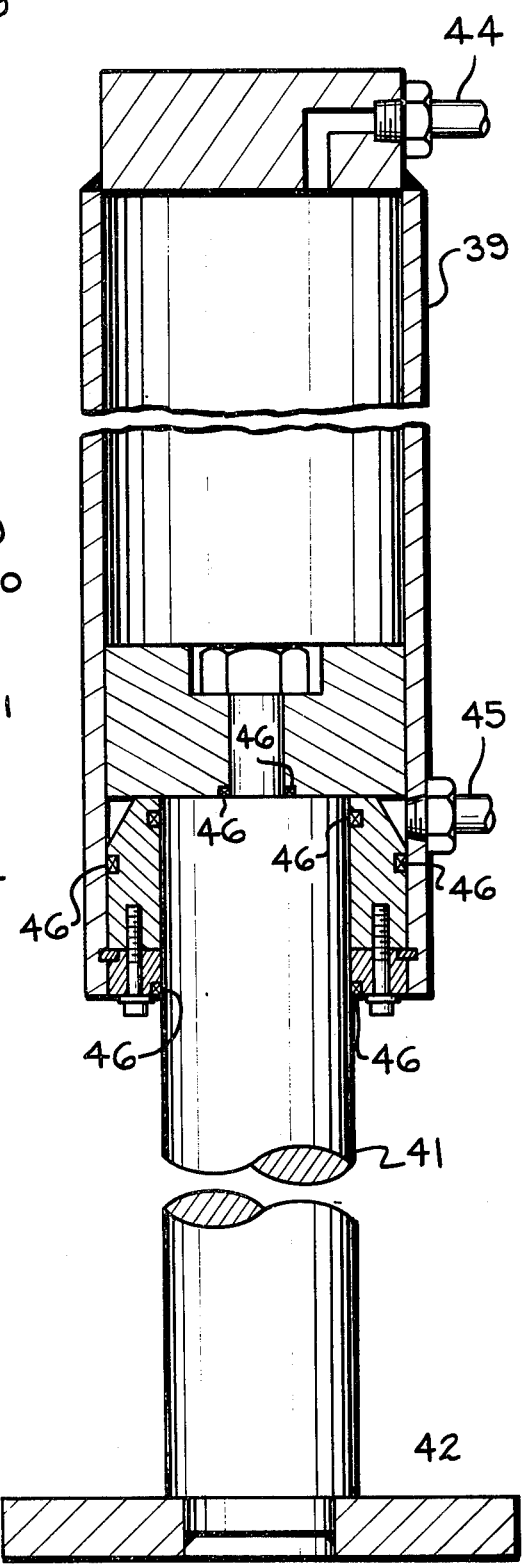
FIG. 4 is a fragmentary, cross sectional view of a lifting cylinder taken along the line 4—4 of FIG. 2, and shown on an enlarged scale.

Referring to FIGS. 1, 2, and 4, a pair of hydraulic lifting cylinders 39 are mounted on the chassis 11 immediately forward of the wheels 20 of the rear axle assembly 15. Referring to FIG. 4, each hydraulic cylinder 39 is preferably a 4 inch cylinder having between a 22 inch and 23 inch stroke. The cylinder 39 includes a piston 40 which is fastened to a rod or lifting leg 41. The lifting leg 41 extends vertically downwardly and terminates in a pressure pad 42 which engages, for example, a section 43 of a platform scale. The cylinder 39 also includes fluid conduits 44 and 45 and a plurality of oil seals 46.

The lifting legs 40 of the cylinders 39 engage the platform scale section 43 when extended. Upon continuing extension, the wheels 17 of the front axle assembly 14 are lifted from the ground, as shown in FIG. 2. The entire gross weight of the vehicle 10 and its load are then carried by the lifting cylinders 39 and the rear axle assembly 15.

The scale testing vehicle 10 is carefully designed so that the loaded center of gravity falls rearward of the hydraulic cylinders 39. Also, the distance between the front edge of a pressure pad 42 to the rear of the axle 19 of the rear axle assembly 15 is approximately 105 inches. This allows the entire gross load to be applied to the section 43 of the platform scale being tested.

Figure 5:
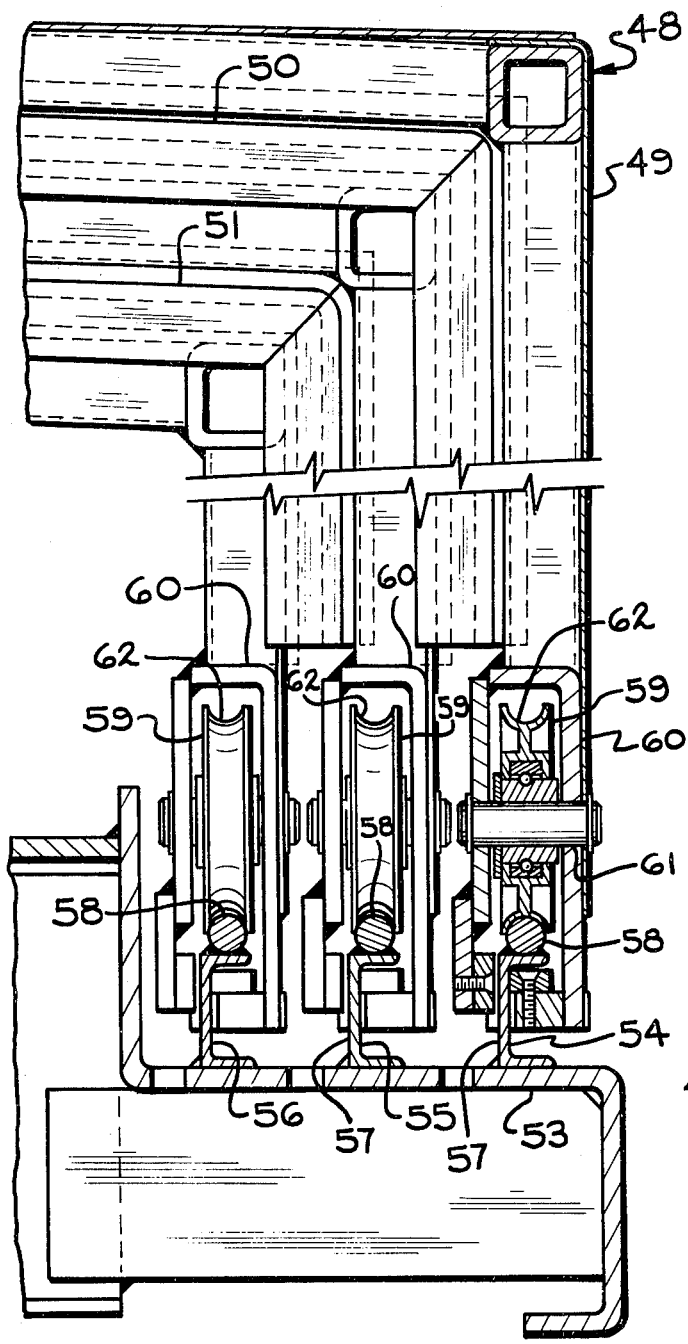
FIG. 5 is a fragmentary, cross sectional view of the canopy mounting means taken along the line 5—5 of FIG. 2, and shown on an enlarged scale.

The scale testing vehicle 10 includes a telescoping canopy 48 having a plurality of sections; in this case three U-shaped canopy sections 49, 50, and 51. FIG. 2 shows the telescoping canopy 48 in its extended position. FIG. 1 shows the canopy 48 telescoped to the rear of the vehicle 10 and FIG. 3 depicts the canopy 48 telescoped to the front of the vehicle 10. While telescoping canopies are known in the prior art, the mounting mechanism for the telescoping canopy 48 is important. Because the scale testing vehicle 10 is normally operated by one man, the telescoping canopy mechanism must be both quick and easy to operate. Referring to FIG. 5, a bed extension 53 mounts three parallel and horizontally spaced pairs of guide tracks 54, 55, and 56. Each one of the pairs of guid tracks 54–56 includes a channel member 57 having a bar 58 welded along its top surface. Four ball bearing sleeved wheels 59 are rotatedly mounted on each one of the canopy sections 49–51. Two sleeved wheels 59 are positioned on each of the opposed sides and at the bottom edges of one of the respective canopy sections 49–51. Referring to FIG. 5, each of the sleeved wheels 59 is positioned within a housing 60 which mates with a respective channel member 57 to form a captive assembly. The housing 60 mounts a shaft 61 which in turn rotatedly mounts the individual sleeved wheel 59. Each sleeved wheel 59 has a concave outer periphery 62 which receives one of the guide bars 58. It has been found that a telescoping canopy assembly, according to the present invention, is very easy for a single operator to utilize.

Referring to FIG. 1, a small weight moving vehicle 65 is preferably carried on the bed 23 of the scale testing vehicle 10. The weight moving vehicle 65 is known in the art and is utilized in moving the uniform weight units 25 after they are placed at ground elevation. The weight moving vehicle 65 is moved between the ground and the bed 23 by the crane 30.

In a scale testing method, according to the present invention, the scale testing vehicle 10, according to the embodiment shown in the drawings, has a gross testing weight of 48,000 pounds. This includes the 24 1,000 pound uniform weight units 25, and the weight of the vehicle 10 and the weight of the vehicle 65. While the gross testing weight will vary depending on the amount of fuel carried, and, for example, dirt build-up on the vehicle 10, it has been found that platform scale sections may be tested within an accuracy of two-tenths of 1 percent.

The operator first drives the scale testing vehicle 10 onto the platform scale section 43. He next energizes the lifting cylinders 39 and extends the lifting legs 40 until the front wheels 17 are lifted from the ground, as shown in FIG. 2. At this time, the entire static load which comprises the gross testing weight of some 48,000 pounds is placed on and within the confines of the platform scale section 43. The known gross testing weight is then compared with the load indicated by either the electronic or mechanical scale. If the two loads or weights correspond to one another, the pistons or lifting legs 40 are retracted and the scale testing vehicle 10 is moved to another platform scale section or to another scale location if testing has been completed at the present location.

On the other hand, if the scale is out of calibration, or if further, more specific testing is required, the vehicle 10 is positioned adjacent the section 43. The operator next actuates the crane 30 and removes the smaller weight moving vehicle 65. Individual one of the uniform weight units 25 are then removed from the weight bed 23 as indicated in FIG. 3. The smaller load moving vehicle 65 is then utilized by the operator to load and test individual areas within the periphery of the scale section 43. If three uniform weights 25 comprising a total of 3,000 pounds are placed at a certain area within the periphery of the platform scale section 43, this known load is then compared with the load or weight indicated by the mechanical or electronic scale. When repairs are needed, the scale testing vehicle 10 includes shop equipment and welding equipment which enables the operator to make most scale repairs or scale calibrations at the ame time the scale is tested.

It has been found that the scale testing vehicle and method, according to the present invention, provides great flexibility and allows platform type scales to be tested and calibrated on a frequent basis. The importance of such testing is easily understood in relationship to a grain handling-elevator operation where 50 weighings per day are made. If the scale has a 200 pound scale error, the composite error amounts to some 10,000 pounds per day and over 3 million pounds in a 1 year period.

I claim:

1. A scale testing vehicle for use on platform scales having at least one scale section, said scale testing vehicle including a chassis, said chassis mounting a front axle assembly and a rear axle assembly, a weight bed mounted on said chassis, a plurality of uniform weight units positioned on said bed, crane means mounted adjacent said chassis for lifting said weight units between said bed and ground elevation and lifting cylinder means mounted adjacent and forward of said rear axle assembly, said lifting cylinder means being movable to an extended position wherein said front axle assembly is elevated and the entire static load of such vehicle and weight units is applied to said lifting cylinder means and said rear axle assembly, such load being applied within the confines of a single one of such scale sections.

2. A scale testing vehicle, according to claim 1, wherein said front axle assembly includes wheel units mounted adjacent the ends of the axle and wherein said rear axle assembly includes a pair of axles with wheels mounted adjacent the respective ends of the axles.

3. A scale testing vehicle, according to claim 1, wherein said lifting cylinder means comprises a pair of hydraulic cylinders, each of said hydraulic cylinders being attached to said chassis immediately forward of said rear axle assembly, each of said cylinders having a rod extending vertically downwardly and a pressure pad mounted on the lower end of said rod.

4. A scale testing vehicle, according to claim 1, wherein said crane means is mounted at the rear of such weight bed, said crane means including an extensible boom having an implement mounted at its outer end for engaging and moving said weight units.

5. A scale testing vehicle, according to claim 1, including a telescoping canopy positioned over said bed, said canopy comprising a plurality of U-shaped canopy sections and means at the bottom of each canopy section for slidably mounting said section relative to said bed and said other canopy sections.

6. A scale testing vehicle, according to claim 5, wherein said canopy mounting means comprises a plurality of pairs of parallel tracks mounted adjacent opposite sides of said bed, and wheels rotatably mounted on such bottom of each of said canopy sections for engaging and guiding movement along a spaced pair of such parallel tracks.

7. A scale testing vehicle for use on platform scales having at least one scale section, said scale testing vehicle comprising a chassis, drive means on said chassis, front and rear axle assemblies mounted adjacent said chassis, said front and rear axle assemblies including wheels mounted adjacent opposed ends of such assemblies, a weight bed mounted on said chassis, a plurality of uniform weight units removably positioned on said bed, crane means mounted adjacent said bed, said crane means including an extensible boom assembly having implement means for engaging said weight units, canopy means adjacent said bed, said canopy means including roller mounted, telescoping canopy sections and lifting cylinder means mounted adjacent and forward of said rear axle assembly, said lifting cylinder means being movable to an extended position wherein said front axle assembly is elevated and the entire static load of such vehicle and weight units is applied to said lifting cylinder means and said rear axle assembly, such load being applied within the confines of a single one of such scale sections.

8. A scale testing vehicle, according to claim 7, wherein said lifting cylinder means comprises a pair of hydraulic cylinders, each of said hydraulic cylinders being attached to said chassis immediately forward of said rear axle assembly, each of said cylinders having a rod extending vertically downwardly and a pressure pad mounted on the lower end of said rod.

9. A scale testing vehicle for use on platform scales having at least one scale section, said scale testing vehicle including a chassis, said chassis mounting a front axle assembly and a rear axle assembly, a weight bed mounted on said chassis for supporting a plurality of uniform weight units, crane means mounted adjacent said chassis for lifting weight units between said bed and ground elevation and lifting cylinder means mounted adjacent and forward of said rear axle assembly, said lifting cylinder means being movable to an extended position wherein said front axle assembly is elevated and the entire load is applied to said lifting cylinder meand and said rear axle assembly, wherein such load is applied to such scale section.

* * * * *